United States Patent [19]
Dixon

[11] Patent Number: 5,377,456
[45] Date of Patent: Jan. 3, 1995

[54] EYEGLASS FRAME MEASURING CRADLE

[75] Inventor: William L. Dixon, Bixby, Okla.

[73] Assignee: Coburn Optical Industries, Inc., Tulsa, Okla.

[21] Appl. No.: 986,463

[22] Filed: Dec. 4, 1992

[51] Int. Cl.⁶ .................................... B24B 41/06
[52] U.S. Cl. .................... 451/364; 269/259 CS; 269/207; 451/390; 451/387; 451/384; 451/396
[58] Field of Search .......... 51/216 R, 216 A, 216 T, 51/216 P, 217 R, 217 P, 217 T, 217 A, 212 S, 217 L, 234, 216 LP; 269/254 CS, 207, 71, 902

[56] References Cited

U.S. PATENT DOCUMENTS

| | | | |
|---|---|---|---|
| 2,727,328 | 2/1954 | Jurinic | 269/254 CS |
| 5,137,263 | 8/1992 | Savoie et al. | 269/254 CS |
| 5,228,242 | 7/1993 | Matsuyama | 57/217 R |

FOREIGN PATENT DOCUMENTS

| | | |
|---|---|---|
| 337864 | 10/1989 | France . |
| 0376803 | 7/1990 | France . |
| 4024272 | 2/1992 | Germany . |
| 4126313 | 3/1992 | Germany . |

*Primary Examiner*—Bruce M. Kisliuk
*Assistant Examiner*—Eileen P. Morgan
*Attorney, Agent, or Firm*—Catalano, Zimmerman & McKay

[57] ABSTRACT

In accordance with the invention a holder is provided for an eyeglass frame having a pair of lens rims spaced apart by a bridge. A pair of supports are fixed in spaced apart relationship on a base plate and a cradle is journalled between the supports to rock beneath an axis spaced from and parallel to the base plate. A pair of jaws transversely mounted on the cradle in relation to the axis is biased toward closing and has a mouth accessible from above the axis. One or both of the jaws inwardly tapered from the mouth to a narrow passage and outwardly tapered from the narrow passage to a throat. The throat has inwardly extending seats. Thus, when a frame is inserted transversely into the mouth toward the throat with its upper rims against one of the jaws and its lower rims against the other of the jaws, the jaws open against bias to pass the frame through the narrow passage and then close under bias to secure the frame in the throat and on the seats. Preferably, the seats are aligned on the jaws so as to support the frame substantially along a plane parallel to the base plate when the cradle is in a normal angular orientation with respect thereto and to support either of the rims substantially along that plane when the cradle is rocked to left or right angular orientations with respect thereto. The cradle is preferably journalled snugly enough to be frictionally secured in its normal, left or right orientations as desired. A tongue extending from the cradle is biased for reciprocal motion between the jaws and to extend from beneath the throat toward the narrow passage to center the frame transversely across the axis while the frame passes through the narrow passage to the throat.

34 Claims, 4 Drawing Sheets

EYEGLASS FRAME MEASURING CRADLE

BACKGROUND OF THE INVENTION

This invention relates generally to optical instruments and more particularly concerns holders for securing an eyeglass frame without lenses into a specific fixed position so that the inside contours or shapes on the rims of the frame may be measured for the purpose of grinding the lenses to precisely fit the rims.

In the measurement of rim contours, the frame is generally secured in a fixed position in a frame holder and a stylus passes along the internal perimeter of each of the rims to determine their coordinates. The data thus collected is then used in the grinding of the appropriate lenses.

Presently known frame holders suffer from a variety of inadequacies. They are generally very complex and, therefore, both initial and maintenance costs are relatively high. They are complicated and confusing in operation, requiring a dexterous manipulation of the frame within the holder to achieve proper positioning with simultaneous operation of a multiplicity of adjusting mechanisms to secure the frame in the selected position. The result is a procedure which clumsy, inconsistent and frustrating. Furthermore, the securing mechanisms frequently cause distortion of the rims, rendering the measured data inaccurate and the lenses imprecise. The amount of this distortion of the rims tends to increase proportionately to the degree of frustration experienced in trying to secure the frame in the holder. These inaccuracies are further compounded because the frames are typically centered in the holder in reference to nose pads which are generally flexible or adjustable, thus resulting in inaccurate centering for the grinding process. Moreover, the stylus generally accumulates only two dimensional data. Consequently, when the perimeter of an individual rim does not lie in substantially a single plane, inaccuracies result. This inaccuracy is multiplied when the rim planes and frame plane are different. That is, known frame holders secure the frame in a plane substantially parallel to the base plane of operation of the stylus, and of the planes of the individual rims are not coincident with the plane of the frame, or unnecessary inaccuracy is introduced into the data collected.

It is, therefore, an object of this invention to provide a frame holder of relatively simple construction. It is a further object of this invention to provide a frame holder that lends itself to easy and consistent operation. Another object of this invention is to provide a frame holder that requires minimal dexterity in securing the frame. A further object of this invention is to provide a frame holder which minimizes distortion of the frame in its secured condition within the holder. It is also an object of this invention to provide a frame holder which centers the frame in relation to the rims and not in relation to the nose pads. Similarly, it is an object of the present invention to provide a frame holder that accurately centers the frame in the holder. It is a further object of this invention to provide a frame holder that permits adjustment of the orientation of the rims in the holder to minimize the occurrence of two dimensional error in the measuring process. Another object of this invention is to provide a frame holder contoured to facilitate accurate location of the frame within the holder.

SUMMARY OF THE INVENTION

In accordance with the invention, a holder is provided for an eyeglass frame having a pair of lens rims spaced apart by a bridge. A pair of supports are fixed in spaced apart relationship on a base plate and a cradle is journalled between the supports to rock beneath an axis spaced from and parallel to the base plate. A pair of jaws transversely mounted on the cradle in relation to the axis is biased toward closing. The jaws have a mouth accessible from above the axis and at least one of the jaws is inwardly tapered from the mouth to a narrow passage and outwardly tapered from the narrow passage to a throat. The throat has inwardly extending seats. Thus, when a frame is inserted transversely into the mouth toward the throat with its upper rims against one of the jaws and its lower rims against the other of the jaws, the jaws open against bias to pass the frame through the narrow passage and then close under bias to secure the frame in the throat on the seats. Preferably, the seats are aligned on the palates so as to support the frame substantially alone; a plane parallel to the base plate when the cradle is in a normal angular orientation with respect thereto. The cradle is preferably journalled snugly enough to frictionally maintain normal, left or right orientations as desired to permit separate planar alignment of each rim. A tongue extending from the cradle is biased for reciprocal motion between the jaws and also to extend from beneath the throat toward the narrow passage to center the frame transversely across the axis while the frame passes through the narrow passage to the throat.

BRIEF DESCRIPTION OF THE DRAWINGS

Other objects and advantages of the invention will become apparent upon reading the following detailed description and upon reference to the drawings in which:

FIG. 3 is a cross-sectional view taken along line 3—3 of FIG. 1;

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Figure 2:
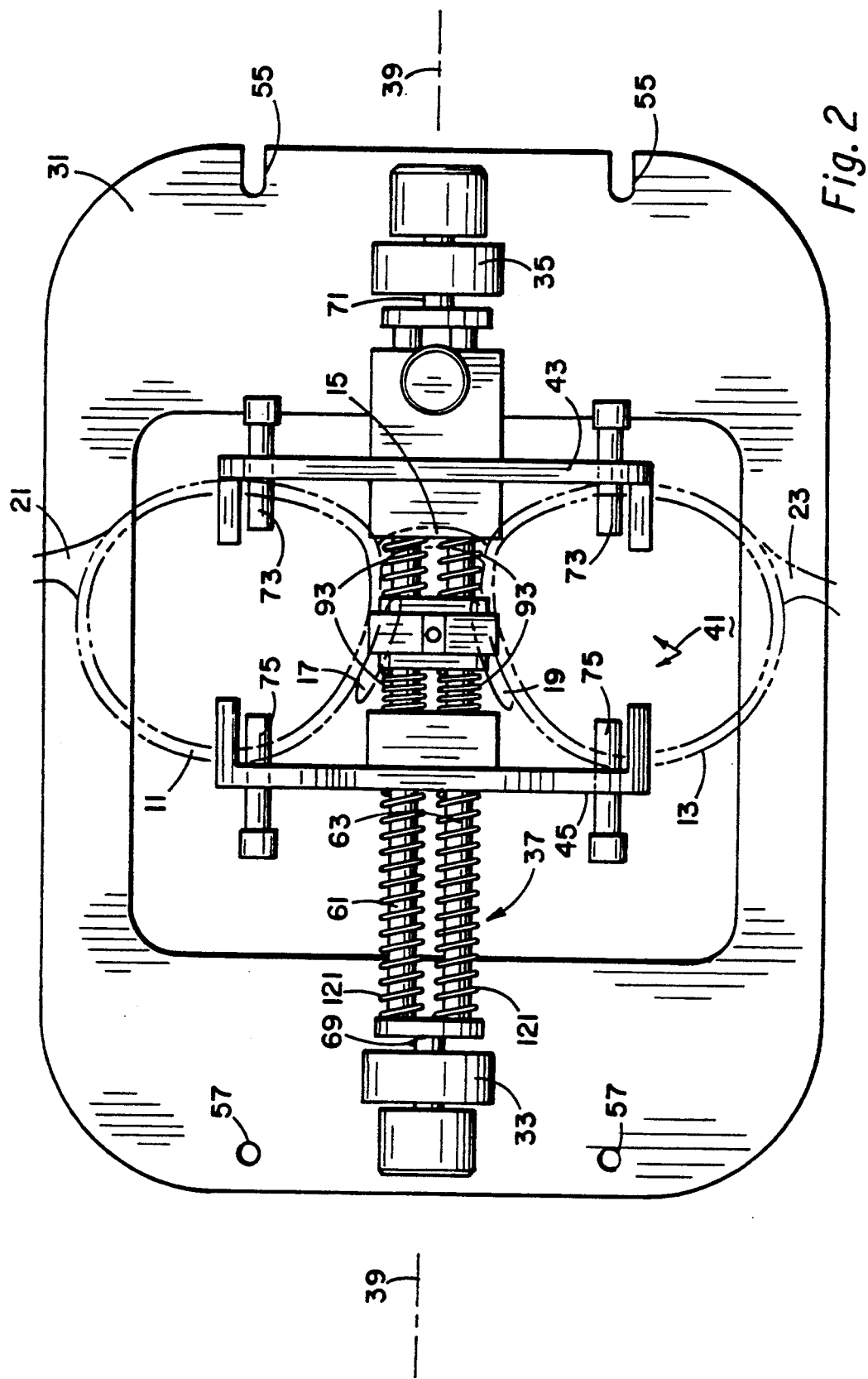
FIG. 2 is a top plan view of the frame holder of FIG. 1.
Figure 9:
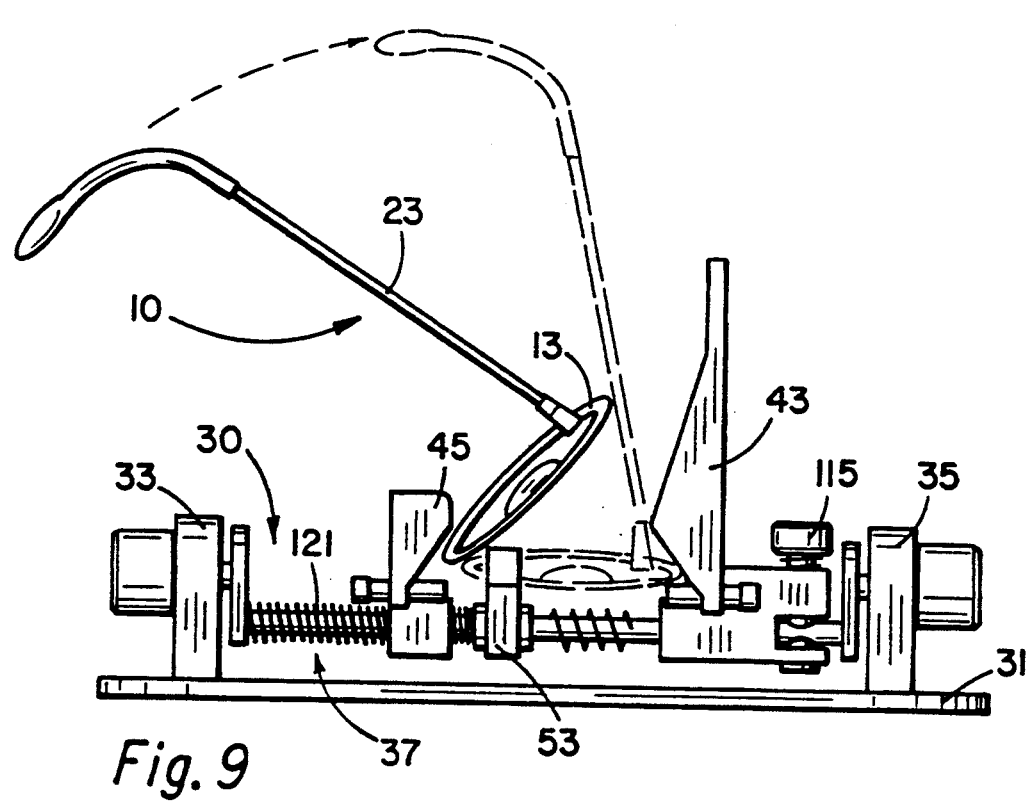
FIG. 9 is a front elevation view of the frame holder of FIG. 1 illustrating the procedure of inserting a typical eyeglass frame therein.

A typical eyeglass frame 10 is shown in FIGS. 2 and 9 and consists of left and right rims 11 and 13 separated by a bridge 15 and having nose pads 17 and 19 and temple pieces 21 and 23.

Figure 1:
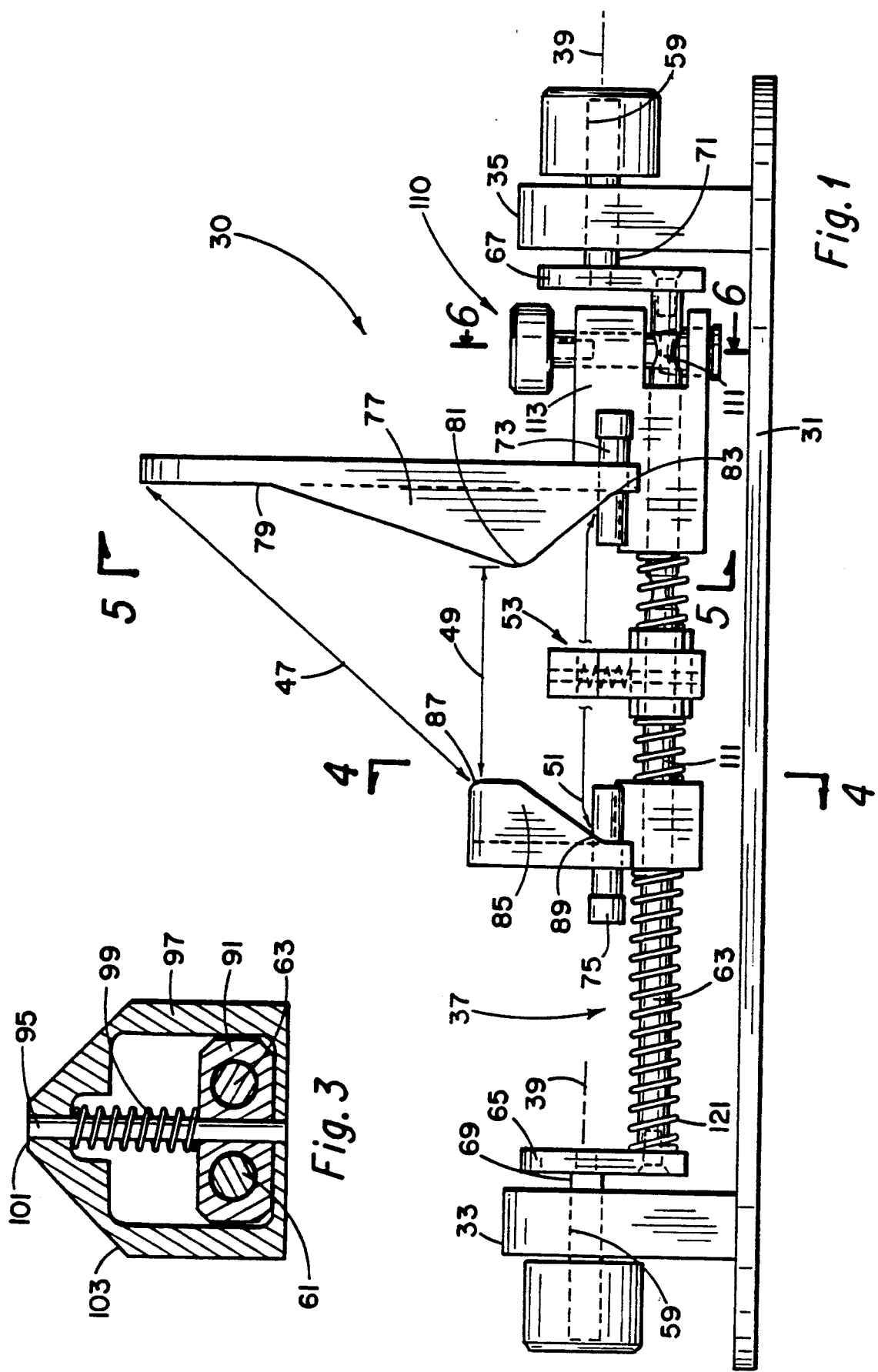
FIG. 1 is a front elevation view of a preferred embodiment of the frame holder.

A frame holder 30 for accurately securing the position of a typical frame 10 for measurement of the coordinates of the rims 11 and 13 of the frame 10 is seen in FIGS. 1 and 2.

The frame holder 30 basic components include a base plate 31, a pair of supports 33 and 35 fixed in spaced apart relationship on the base plate 31, a cradle 37 journalled between the supports 33 and 35 to rock beneath the axis of rotation 39 of the cradle 37 which is spaced above and preferably parallel to the base plate 31. A pair of jaws 41 is transversely slidably mounted on the cradle 37. Preferably, one of the jaws 43 is fixed in place on the cradle 37 while the other jaw 45 is biased toward closing. At least one jaw, preferably the fixed jaw 43, is inwardly tapered from a mouth portion 47 to a narrow passage 49 and outwardly tapered from the narrow passage 49 to a throat. 51. Seats or pins 73 extend inwardly at the throat 51. Preferably, the seats 73 are aligned to support the frame 10 substantially along a plane parallel to the base plate 31 when the cradle 37 is in a normal angular orientation with respect thereto. The cradle 37 is further preferably journalled snugly in the supports 33 and 35 so that the cradle 37 will maintain any selected angular orientation in the supports 33 and 35 absent a sufficient force to overcome the friction of the fit. A tongue 53 extending upwardly from the cradle 37 is biased for reciprocal motion between the jaws 41 and also biased to extend upwardly from the cradle 37. At its maximum extension, the tongue 53 reaches to the area of the narrow passage 49 and at its minimum extension reaches beyond the throat 51 so as to center the frame 10 transversely across the cradle axis 39 as the frame 10 passes through the narrow passage 49 and into the throat 51.

Figure 7:
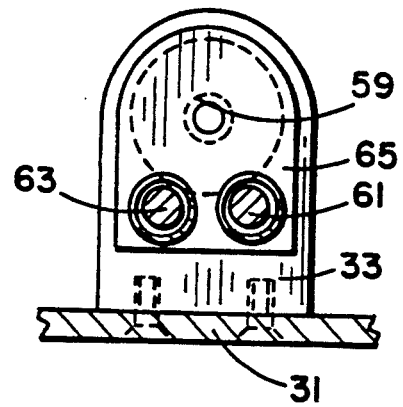
FIG. 7 is an elevation view taken along the line 7—7 of FIG. 1.

Preferably, the base plate 31 is substantially rectangular and has one or more slots 55 and holes 57 through opposite portions thereof to facilitate rapid mounting and dismounting of the frame holder 30 on a measuring device (not shown). As best seen in FIGS. 1 and 7, the supports 33 and 35 mounted on opposite sides of the base plate 31 have apertures 59 therethrough aligned on the cradle 37, preferably with the axis 39 parallel to the plate 31 and a plane perpendicular to the plate 31 and extending through the axis 39 dividing the plate 31 into geometric halves. The apertured supports 33 and 35 provide a bearing mount for the cradle 37.

The cradle 37 consists of an elongated guide, preferably formed by a pair of parallel spaced apart guide rails 61 and 63 disposed symmetrically beneath the cradle axis 39. The guide rails 61 and 63 are fixed in relationship to each other by a pair of mounting blocks 65 and 67, one at each end of the guide rails 61 and 63, which have shafts 69 and 71 extending outwardly therefrom along the cradle axis 39, the guide rails 61 and 63 being displaced radially from the axis 39. With the shafts 69 and 71 mounted snugly through the apertures 59 in the supports 33 and 35, the orientation of the cradle 37 relative to the base plate 31 can be adjusted by the rotation of the shafts 69 and 71 within the apertures 59.

Figure 4:
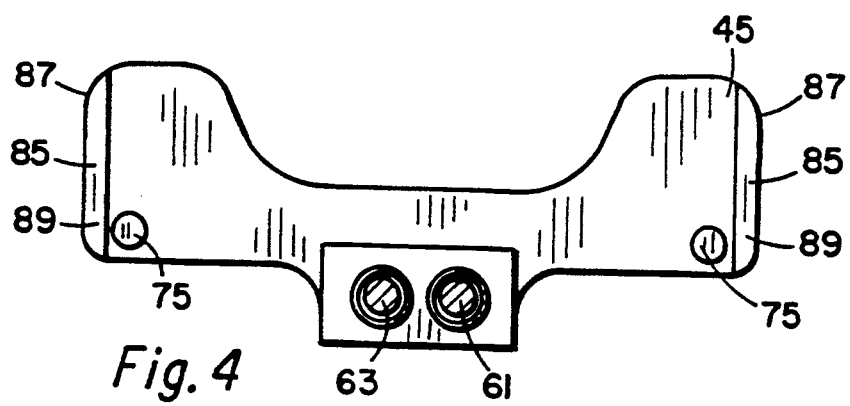
FIG. 4 is an elevation view taken along the line 4—4 of FIG. 1.
Figure 5:
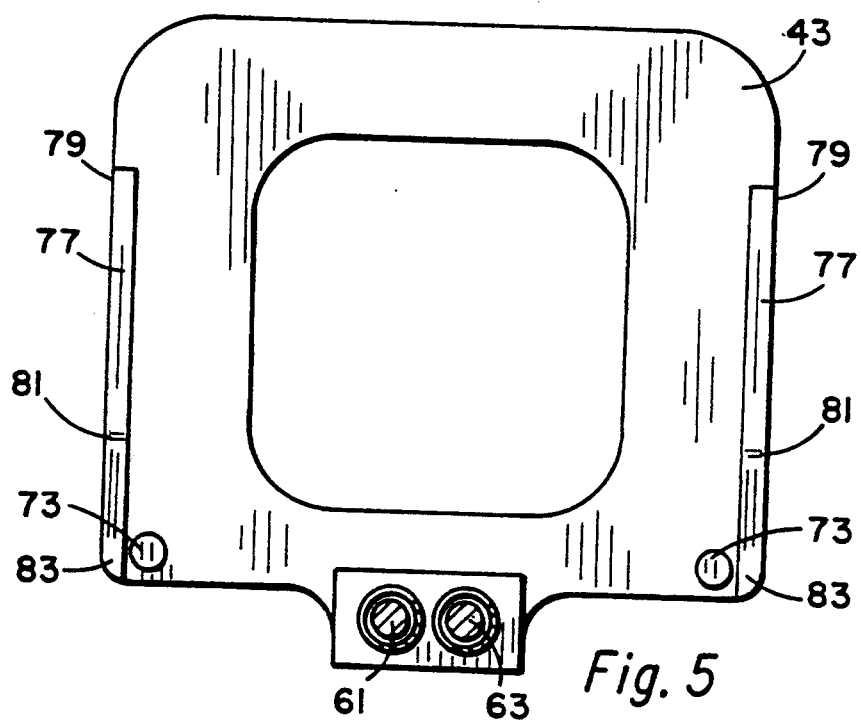
FIG. 5 is an elevation view taken along the line 5—5 of FIG. 1.

The jaws 41 consist of a fixed jaw or carriage 43 mounted proximate one end of the guide rails 61 and 63 a movable jaw or carriage 45 slidably mounted on the guide rails 61 and 63 proximate their other end. Each of the carriages 43 and 45 transversely straddles the cradle 37 and extends upwardly in relation to the base plate 31. As shown in FIGS. 1, 2 and 5, spaced apart on the fixed carriage 43 above the guide rails 61 and 63 and equidistant from the cradle axis 39 are the pair of limit pins 73 which extend toward the movable carriage 45, preferably along axes parallel to the cradle axis 39. These pins 73 are spaced to support the upper portions of the rims 11 and 13 of the frame 10. As shown in FIGS. 1, 2 and 4, similar limit pins 75 mounted equidistant from the cradle axis 39 on the movable carriage 45 extend toward the fixed carriage 43, preferably along axes parallel to the cradle axis 39, spaced at a distance to support the lower portions of the rims 11 and 13 of the frame 10.

Disposed on the fixed carriage 43 above the limit pins 73 are a pair of spaced apart displacing wedges 77. The wedges 77 taper from an upper minimum displacement edge 79 to an intermediate maximum displacement edge 81 and then back to a lower minimum displacement edge 83. The taper may be linear or nonlinear, depending on the desired characteristics of operation of the device.

Displacing wedges 85 are also disposed above the limit pins 75 on the movable carrier 45, the lower portions preferably tapering to the intermediate maximum displacement edge 87 from the lower minimum displacement edge 89. However, the upper portion of the movable carriage displacing wedges 85 need not be tapered.

The tongue 53 extending from the cradle 37 is illustrated in FIG. 3 and consists of a carrier 91 slidably mounted on the guide rails 61 and 63 for reciprocal motion under bias between the carriages 43 and 45. As shown in FIG. 2, the reciprocal bias is accomplished by a plurality of helical springs 93 wound around each of the guide rails 61 and 63 slightly compressed between the carriages 43 and 45 and the carrier 91. A pintle 95 extends radially upwardly from the carrier 91 and through the cradle axis 39. A penetrating or centering member 97 slidably mounted on the pintle 95 extends away from the carrier 91 under bias. As shown, bias is accomplished by a helical spring 99 wound around the pintle 95 between the carrier 91 and the centering member 97. The centering member tapers in a plane transverse to the cradle axis from its narrow tip 101 to a wider portion 103. Preferably, the tip 101 of the centering member 97 extends proximate the narrow passage 49 or maximum displacement edges 81 and 87 when the biasing spring 99 is in its fully expanded state and this wider portion 103 extends below the upper surface of the limit pins 73 and 75 or the throat 51 of the frame holder 30 when the biasing spring 99 is fully compressed.

Figure 6:
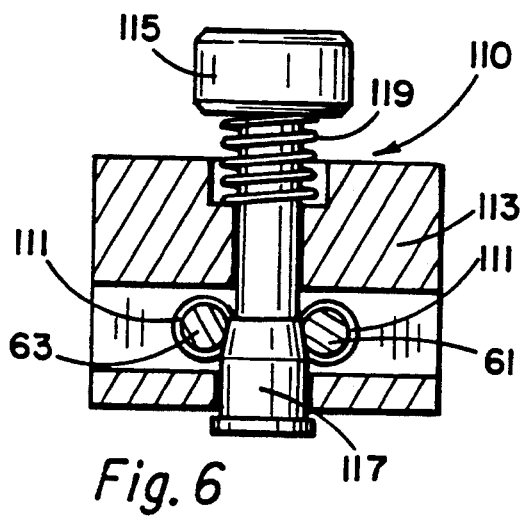
FIG. 6 is a cross-sectional view taken along the line 6—6 of FIG. 1.

In a particularly preferred embodiment, the fixed carriage 43 is mounted on the guide rails 61 and 63 in a sliding relationship secured by a pin assembly 110 as is illustrated in FIGS. 1 and 6. In this arrangement, the guide rails 61 and 63 are provided with a plurality of aligned pairs of annular channels 111. The mounting portion 113 of the fixed carriage 43 is fitted with a plunger 115 which extends through the mounting portion 113 between the guide rails 61 and 63 where it connects to a wider locking segment 117 which is biased upwardly by a helical spring 119. Thus, with the locking segment biased upwardly into the annular channel 111, the fixed carriage 43 is locked in its position on the guide rails 61 and 63. The positioning of the fixed carriage 43 can then be adjusted by depressing the plunger 115 to disengage the locking portion 116 from the channel 111. The entire carriage 43 may then be slid along the rails 61 and 63 until the locking portion 117 is aligned with a different pair of annular channels 111. The plunger 115 is then released to allow the locking portion 117 to reengage between the guide rails 61 and 63 and thus lock the fixed carriage into its selected position.

Figure 8:
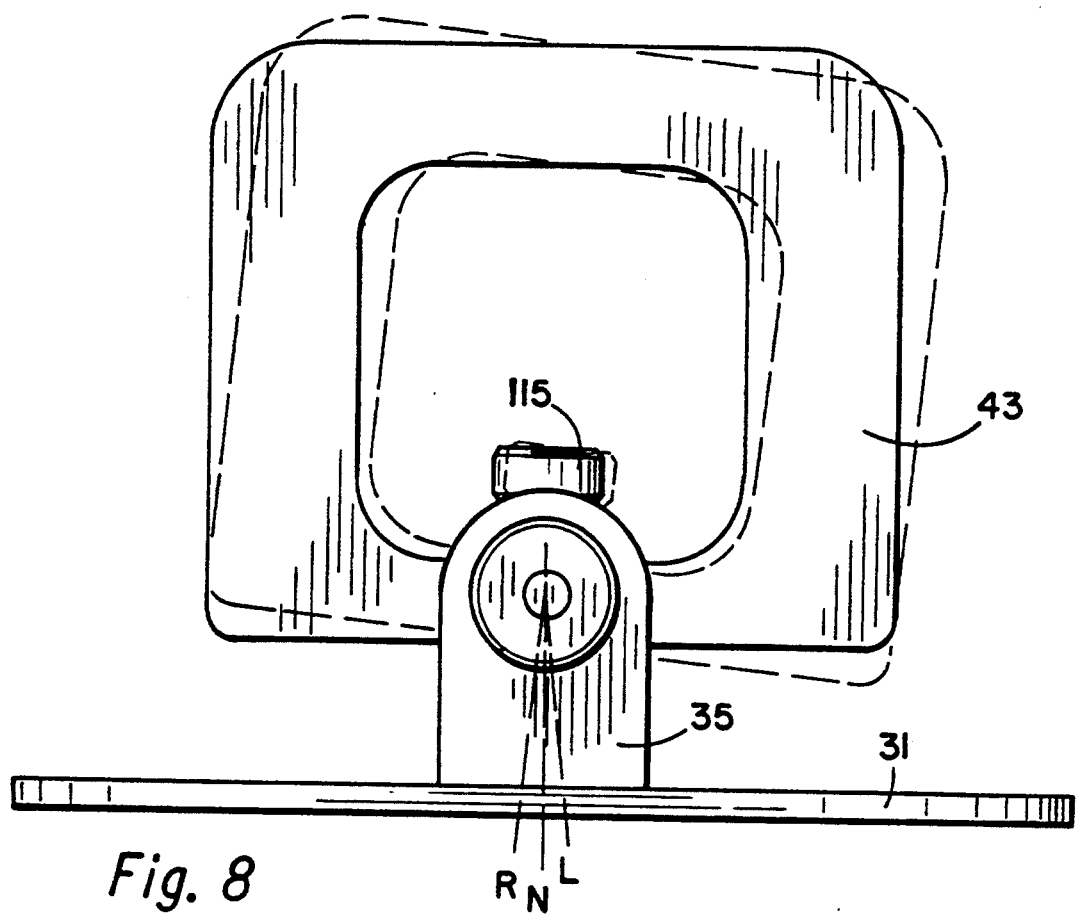
FIG. 8 is a right side elevation of the frame holder of FIG. 1.

Turning now to FIGS. 8 and 9, the operation of the frame holder 30 can be explained. The position of the fixed carriage 43 is first set to accommodate the frame 10 to be secured by manipulation of the plunger 115, if applicable. The frame 10 is then aligned at the mouth 47 of the frame holder 30 such that the lens rims 11 and 13 are substantially along lines parallel to the base plate 31 with the upper portions of the rims 11 and 13 transversely aligned over their respective limit pins 73 and the lower portions of the rims 11 and 13 transversely aligned over their respective limit pins 75. In this condition, the frame 10 should be approximately centered transversely across the cradle axis 39. The frame 10 may then be urged downwardly through the mouth 47 in a variety of ways. For example, the upper and lower rims may be urged simultaneously into the mouth, the lower portions of the rims 11 and 13 may be seated on the movable carrier limit pins 75 or the upper portions of the rims 11 and 13 may be seated on the fixed carriage limit pins 73 and the lower portions of the rims 11 and 13 then rotated downwardly toward the movable carriage limit pins 75. In any event, as the rims 11 and 13 slide along either or both the wedges 77 and 85 toward the narrow passage 49 defined by the maximum displacement edges 81 and 87, the movable carriage or jaw 45 will be shifted against its bias 121 away from the fixed carriage or jaw 43 to permit the continued downward insertion of the frame 10. When the frame 10 passes the narrow passage 49 or maximum displacement edge 81 or 87, the bias 121 urges the movable carriage 45 toward the fixed carriage 43, continuing to force the upper and lower portions of the rims 11 and 13 along the portion of the wedges 77 or 85 below the maximum displacement edge 81 or 87 into a seated position atop the limit pins 73 and 75 at the lower minimum displacement edges 83 and 84 or throat 51 of the device. As this insertion of the frame 10 from the mouth 47 of the device to the throat 51 of the device is in progress, the centering member 97 of the tongue 53 slips or penetrates between the rims 11 and 13 of the frame 10 to accurately center the frame 10 transversely across the cradle axis 39. The upward bias 99 of the centering member 97 and the reciprocal bias 93 of the carrier 91 assure the consistent appropriate positioning of the frame 10 in relation to the axis 39. Once the frame 10 is centered and resting on the limit pins 73 and 75, the bias 121 of the movable carriage 45 enables the jaws 41 to firmly grip the frames 10 in secure position at the throat 51 of the frame holder 30.

As can best be seen in FIG. 8, when the radius extending from the axis of rotation 39 of the cradle 37 through the center of the elongated guide or guide rails 61 and 63 is perpendicular to the base plate 31, then, since the limit pins 73 and 75 are preferably disposed in a single plane, the frame 10 mounted on the frame holder 30 should substantially lie in a plane parallel to the base plate 31. If the individual rims 11 and 13 of the frame 10 do not lie in substantially the same plane as the plane of the frame 10, then the cradle 37 can be rocked slightly to the right or to the left to bring one of the rims 11 or 13 into a substantially parallel relationship to the base plate 31. Thus, if the rims 11 and 13 and the frame 10 are substantially in the same plane, a single alignment of the frame 10 with the cradle 37 in its normal angular orientation N will permit the measuring of both rims 11 and 13 without further adjustment of the frame holder 30. However, if the rims 11 and 13 are in significantly different planes than the frame 10, the cradle 37 can be rocked to one angular orientation L to level one of the rims 11 or 13 for measurement and then rocked to the opposite angular orientation R to level the other rim 13 or 11 for measurement.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A holder for an eyeglass frame having a pair of lens rims spaced apart by a bridge comprising:
   a base plate:
   a pair of supports fixed in spaced apart relationship on said base plate;
   a cradle journalled between said supports to rock beneath an axis spaced from and parallel to said base plate;
   a pair of jaws transversely mounted on said cradle in relation to said axis and biased toward closing having a mouth accessible from above said axis, at least one jaw being inwardly tapered from said mouth to a narrow passage and outwardly tapered from said narrow passage to a throat having seats extending inwardly therefrom,
   whereby, when a frame is inserted transversely into said mouth toward said throat with its upper rims against one of said jaws and its lower rims against the other of said jaws, said jaws open against bias to pass the frame through said narrow passage and then close under bias to secure the frame in said throat on said seats.

2. A frame holder according to claim 1, said seats being aligned on said jaws to support the frame substantially along a plane parallel to said base plate when said cradle is in a normal angular orientation with respect thereto and to support the rims independently substantially along said plane when said cradle is rocked to left and right angular orientations with respect thereto.

3. A frame holder according to claim 2 further comprising means for selectively securing said cradle in said normal, left and right orientations.

4. A frame holder according to claim 1 further comprising a tongue extending from said cradle biased for reciprocal motion between said jaws and for extension from beneath said throat and toward said narrow passage for centering the frame transversely across said axis while the frame passes through said narrow passage to said throat.

5. A holder for an eyeglass frame having a pair of lens rims spaced apart by a bridge comprising:
   an elongated guide symmetrically disposed in relation to a longitudinal axis;
   a carriage fixed to said guide proximate one end thereof having means thereon for receiving and supporting a top portion of the rims above said guide and transverse to said axis;
   a carriage slidably mounted on said guide proximate another end thereof for movement along said axis having means thereon for receiving and supporting a bottom portion of the rims above said guide and transverse to said axis; and means continuously, resiliently biasing said movable carriage toward said fixed carriage for securing a frame therebetween.

6. A frame holder according to claim 5 further comprising:

means slidably mounted on said guide for penetrating between the rims during receiving thereof by said receiving and supporting means; and means reciprocally biasing said penetrating means between said fixed and movable carriages and radially biasing at least a portion of said penetrating means away from said axis and between the rims supported by said carriages for centering the frame transversely over said axis during receiving thereof by said receiving and supporting means.

7. A frame holder according to claim 5 further comprising means for rotating said guide radially about said axis and for maintaining said guide in a selected angular orientation to said axis.

8. A frame holder according to claim 7, said guide comprising a pair of guide rails fixed in parallel, spaced apart relationship with respect to said axis.

9. A frame holder according to claim 8 further comprising a pair of blocks, one fixed to each end of said pair of guide rails, securing said rails in parallel, spaced apart relationship.

10. A holder for an eyeglass frame having a pair of lens rims spaced apart by a bridge comprising:

a base plate;

a pair of bearings, one mounted on opposite sides of said plate;

a pair of guide rails fixed between a pair of blocks in parallel, spaced apart relationship with respect to a longitudinal axis;

a pair of journal means, one fixed to and extending from an outer end of each of said blocks coaxially with said axis and snugly inserted within said bearings for maintaining said journal means in a selected angular orientation therein;

a carriage fixed to said guide rails proximate one end thereof having means thereon for receiving and supporting a top portion of the rims above said guide rails and transverse to said axis;

a carriage slidably mounted on said guide rails proximate another end thereof for movement along said axis having means thereon for receiving and supporting a bottom portion of the rims above said guide rails and transverse to said axis; and means biasing said movable carriage toward said fixed carriage for securing a frame therebetween.

11. A holder for an eyeglass frame having a pair of lens rims spaced apart by a bridge comprising:

an elongated guide symmetrically disposed in relation to a longitudinal axis;

a carriage fixed to said guide proximate one end thereof having at least one displacing wedge disposed on said fixed carriage having a maximum displacement edge transverse to said axis and extending along a line perpendicular to a radius emanating from said axis, said wedge tapering to first and second minimum displacement edges on either side of and parallel to said maximum displacement edge, whereby a frame holder disposed between said fixed and movable carriages causes said movable carriage to slide against its bias as the upper portions of the rims are urged from said first minimum displacement edge toward said maximum displacement edge and said movable carriage biasing means causes the upper portions of the rims to move toward said second minimum displacement edge as the upper portions of said rims cross said maximum displacement edge for receiving and supporting a top portion of the rims above said guide and transverse to said axis;

a carriage slidably mounted on said guide proximate another end thereof for movement along said axis having means thereon for receiving and supporting a bottom portion of the rims above said guide and transverse to said axis; and means biasing said movable carriage toward said fixed carriage for securing a frame therebetween.

12. A frame holder according to claim 11, said fixed carriage supporting means having a surface below said second minimum displacement edge for contacting the upper portions of said rims when said upper portions of said rims are biased to said second minimum displacement edge, said contacting surface being along a line perpendicular to said radius.

13. A frame holder according to claim 12, said surface being defined by a pair of pins extending from said fixed carriage toward said movable carriage along axes equally displaced from and parallel to said axis.

14. A frame holder according to claim 13, said fixed carriage receiving means comprising a pair of said displacing wedges, one aligned with each said pin.

15. A frame holder according to claim 14, each of said wedges having a surface extending from its first minimum displacement edge to its maximum displacement edge defining a cam.

16. A frame holder according to claim 14, each of said wedges having a surface extending from its maximum displacement edge to its second minimum displacement edge defining a cam.

17. A holder for an eyeglass frame having a pair of lens rims spaced apart by a bridge comprising:

an elongated guide symmetrically disposed in relation to a longitudinal axis;

a carriage fixed to said guide proximate one end of said guide having means thereon for receiving and supporting a top portion of the rims above said guide and transverse to said axis;

a carriage slidably mounted on said guide proximate another end of said guide for movement along said axis having at least one displacing wedge disposed on said movable carriage having a maximum displacement edge transverse to said axis and extending along a line perpendicular to a radius emanating from said axis, said wedge tapering to a minimum displacement edge parallel to said maximum displacement edge, whereby a frame holder disposed between said fixed and movable carriages causes said movable carriage to slide against its bias as the lower portions of the rims are urged from said first minimum displacement edge toward said maximum displacement edge and said movable carriage biasing means causes said movable carriage to move toward said fixed carriage as the lower portions of said rims cross said maximum displacement edge for receiving and supporting a bottom portion of the rims above said guide and transverse to said axis; and means biasing said movable carriage toward said fixed carriage for securing a frame therebetween.

18. A frame holder according to claim 17, said movable carriage supporting means having a surface below said second minimum displacement edge for contacting the lower portions of said rims when said lower portions of said rims are biased to said second minimum displacement edge, said contacting surface being along a line perpendicular to said radius.

19. A frame holder according to claim 18, said surface being defined by a pair of pins extending from said movable carriage toward said fixed carriage along axes equally displaced from and parallel to said axis.

20. A frame holder according to claim 19, said movable carriage receiving means comprising a pair of said displacing wedges, one aligned with each said pin.

21. A frame holder according to claim 20, each of said wedges having a surface extending from its first minimum displacement edge to its maximum displacement edge defining a cam.

22. A frame holder according to claim 20, each of said wedges having a surface extending from its maximum displacement edge to its second minimum displacement edge defining a cam.

23. A holder for an eyeglass frame having a pair of lens rims spaced apart by a bridge comprising:
an elongated guide symmetrically disposed in relation to a longitudinal axis;
a carriage fixed to said guide proximate one end of said guide having means thereon for receiving and supporting a top portion of the rims above said guide and transverse to said axis;
a carriage slidably mounted on said guide proximate another end thereof for movement along said axis having means thereon for receiving and supporting a bottom portion of the rims above said guide and transverse to said axis;
means slidably mounted on said guide for penetrating between the rims during receiving thereof by said receiving and supporting means;
means reciprocally biasing said penetrating means between said fixed and movable carriages and radially biasing at least a portion of said penetrating means away from said axis and between the rims supported by said carriages for centering the frame holder transversely over said axis; and
means continuously, resiliently biasing said movable carriage toward said fixed carriage for securing the centered frame holder therebetween.

24. A holder for an eyeglass frame having a pair of lens rims spaced apart by a bridge comprising:
an elongated guide symmetrically disposed in relation to a longitudinal axis;
a carriage fixed to said guide proximate one end of said guide having means thereon for receiving and supporting a top portion of the rims above said guide and transverse to said axis;
a carriage slidably mounted on said guide proximate another end of said guide for movement along said axis having means thereon for receiving and supporting a bottom portion of the rims above said guide and transverse to said axis;
a carrier slidably mounted on said guide;
a pintle mounted on said carrier and extending radially from said axis;
a centering member slidably mounted on said pintle and symmetrically tapered from a narrow portion at a free end of said pintle toward a wide portion nearer a mounted end of said pintle for penetrating between the rims during receiving thereof by said receiving and supporting means;
means reciprocally biasing said centering member between said fixed and movable carriages and radially biasing at least a portion of said centering member away from said axis and between the rims supported by said carriages for centering the frame holder transversely over said axis; and
means biasing said movable carriage toward said fixed carriage for securing a frame therebetween.

25. A frame holder according to claim 24, said reciprocally biasing means comprising a plurality of helical springs, at least one wound about said guide between said fixed carriage and said carrier and at least one wound about said guide means between said movable carriage and said carrier.

26. A frame hoarder according to claim 25, said radially biasing means comprising a helical spring wound about said pintle between said carrier and said centering member.

27. A holder for an eyeglass frame having a pair of lens rims spaced apart by a bridge comprising:
a base plate;
bearing means mounted on opposite side portions of said base plate;
a pair of parallel guide rails fixed between a pair of mounting blocks, each of said mounting blocks having a shaft snugly journaled for forced rotation in said bearing means about an axis parallel to and symmetrically displaced from said guide rails;
a first carriage fixed to said guide rails proximate one end of said guide rails;
a second carriage slidably mounted on said guide rails proximate another end thereof;
means disposed between said second carriage and its adjacent one of said blocks for biasing said second carriage toward said first carriage to grip the frame holder therebetween;
first and second pairs of limit pins extending from said first and second carriages, respectively, toward the opposite of said first and second carriages along axes symmetrically displaced from and parallel to said axis for supporting said rims substantially on a plane above said axis and perpendicular to a radius extending therefrom; and
first and second pairs of displacing wedges disposed on said first and second carriages, respectively, one said wedge above a corresponding one of each of said first and second pairs of pins, each said wedge having a maximum displacement edge transverse to said axis and extending along a line perpendicular to a radius emanating from said axis, each said wedge tapering to first and second minimum displacement edges on either side of and parallel to said maximum displacement edge, whereby a frame holder inserted between said first and second carriages causes said second carriage to slide against its bias as the rims are urged from said first minimum displacement edges toward said maximum displacement edges and said second carriage biasing means causes the rims to move toward said second minimum displacement edges and against their corresponding limit pins as the rims cross said maximum displacement edges of said wedges.

28. A frame holder according to claim 27 further comprising:

means slidably mounted on said guide for penetrating between the rims during receiving thereof between said first and second carriages;

means reciprocally biasing said penetrating means between said fixed and movable carriages and means radially biasing at least a portion of said penetrating means away from said axis and between the rims supported by said carriages for centering the frame holder transversely over said axis.

29. A frame holder according to claim 28, said penetrating means comprising:

a carrier slidably mounted on said guide rails;

a pintle mounted on said carrier and extending radially from said axis; and a centering member slidably mounted on said pintle and symmetrically tapered from a narrow portion at a free end of said pintle toward a wide portion nearer a mounted end of said pintle.

30. A frame holder according to claim 29, said narrow portion of said centering member extending toward a plane passing through said maximum displacement edges when said radially biasing means is fully expanded and said wide portion of said centering member extending short of a plane passing through said pins when said radially biasing means is fully compressed.

31. A frame holder according to claim 29, said reciprocally biasing means comprising a plurality of helical springs, at least one wound about each said guide rail between said first carriage and said carrier and at least one wound about each said guide rail between said second carriage and said carrier.

32. A frame holder according to claim 31, said radially biasing means comprising a helical spring wound about said pintle between said carrier and said centering member.

33. A frame holder according to claim 27, said limit pin axes being substantially disposed in a single plane.

34. A frame holder according to claim 27, said shaft being rotatable about said axis to selectively orient one of two pairs of parallel lines, one pair substantially passing through the upper and lower portions, respectively, of each of the rims, in parallel relationship to a plane parallel to said base plate.

* * * * *